(12) United States Patent
Yang

(10) Patent No.: US 10,394,338 B2
(45) Date of Patent: Aug. 27, 2019

(54) KEYBOARD

(71) Applicant: COOLER MASTER TECHNOLOGY INC., New Taipei (TW)

(72) Inventor: Chung-Wei Yang, New Taipei (TW)

(73) Assignee: Cooler Master Technology Inc., New Taipei (TW)

( * ) Notice: Subject to any disclaimer, the term of this patent is extended or adjusted under 35 U.S.C. 154(b) by 49 days.

(21) Appl. No.: 15/436,099

(22) Filed: Feb. 17, 2017

(65) Prior Publication Data
US 2017/0242493 A1  Aug. 24, 2017

Related U.S. Application Data

(60) Provisional application No. 62/296,608, filed on Feb. 18, 2016.

(51) Int. Cl.
| | | |
|---|---|---|
| *F21V 19/00* | (2006.01) | |
| *F21V 23/06* | (2006.01) | |
| *F21Y 115/10* | (2016.01) | |
| *H01H 13/83* | (2006.01) | |
| *G06F 3/02* | (2006.01) | |

(52) U.S. Cl.
CPC ........ *G06F 3/0202* (2013.01); *F21V 19/0015* (2013.01); *F21V 23/06* (2013.01); *H01H 13/83* (2013.01); *F21Y 2115/10* (2016.08); *H01H 2219/062* (2013.01)

(58) Field of Classification Search
CPC .. F21V 19/0015; F21V 23/06; F21Y 2115/10; G06F 3/0202; H01H 13/83; H01H 2219/062

USPC ...................................................... 362/23.03
See application file for complete search history.

(56) References Cited

U.S. PATENT DOCUMENTS

| | | | | |
|---|---|---|---|---|
| 3,766,350 A | * | 10/1973 | Van Dyk ................ | H01H 1/029 200/314 |
| 4,028,515 A | * | 6/1977 | Desio ..................... | H01H 1/242 200/276.1 |
| 4,225,766 A | * | 9/1980 | Pfeifer ................... | H01H 9/182 116/202 |
| 4,302,647 A | * | 11/1981 | Kandler ................. | H01H 13/83 200/16 A |
| 4,431,879 A | * | 2/1984 | Fujita .................... | H01H 13/14 200/314 |

(Continued)

FOREIGN PATENT DOCUMENTS

| | | |
|---|---|---|
| CN | 105045403 A | † 11/2015 |
| TW | M500922 U | 5/2015 |
| TW | M524510 U | 6/2016 |

*Primary Examiner* — Tsion Tumebo
(74) *Attorney, Agent, or Firm* — McDermott Will & Emery LLP

(57) ABSTRACT

A keyboard includes a circuit board having an upper surface, a lower surface opposite to the upper surface, and a plurality of cut-out portions, a plurality of key modules positioned on the upper surface and over the plurality of cut-out portions, and a plurality of light sources installed on the lower surface of the circuit board, wherein at least a portion of at least one light source is positioned in a corresponding cut-out portion. Each light source includes a light emitting portion coupled to the second circuit layer. At least some of the light emitting portion is disposed in the cut-out portion beneath and bounded by the key module.

19 Claims, 4 Drawing Sheets

(56) References Cited

U.S. PATENT DOCUMENTS

| | | | | |
|---|---|---|---|---|
| 4,778,952 | A * | 10/1988 | Watkins | H01H 13/70 200/292 |
| 4,811,175 | A * | 3/1989 | DeSmet | H01H 13/702 200/313 |
| 5,138,119 | A * | 8/1992 | Demeo | H01H 13/702 200/314 |
| 5,655,826 | A * | 8/1997 | Kouno | H01H 13/702 200/314 |
| 6,743,993 | B1 * | 6/2004 | Clark | H01H 13/702 200/314 |
| 7,514,643 | B1 * | 4/2009 | Tittle | H01H 13/023 200/314 |
| 8,232,492 | B1 * | 7/2012 | Davis | H01H 13/83 200/314 |
| 9,711,301 | B2 * | 7/2017 | Plancherel | H01H 13/14 |
| 9,846,492 | B2 * | 12/2017 | Chen | H03K 17/969 |
| 9,941,070 | B2 * | 4/2018 | Liu | H01H 13/14 |
| 2008/0029373 | A1 * | 2/2008 | Hotta | H01H 13/785 200/314 |
| 2008/0113707 | A1 * | 5/2008 | Nesemeier | G06F 3/0202 463/16 |
| 2009/0322568 | A1 * | 12/2009 | Yoshida | H01H 13/83 341/22 |
| 2010/0123606 | A1 * | 5/2010 | Nishino | G06F 3/0202 341/22 |
| 2012/0298491 | A1 * | 11/2012 | Ozias | G06F 1/1662 200/314 |

\* cited by examiner
† cited by third party

KEYBOARD

CROSS-REFERENCE TO RELATED APPLICATIONS

This non-provisional application claims priority under 35 U.S.C. § 119 to provisional application 62/296,608 filed Feb. 18, 2016, in the US Patent and Trademark Office (USPTO), the contents of this application being incorporated herein by reference in their entirety.

BACKGROUND

Field

Embodiments disclosed are related to computer keyboards, and more particularly, to a mechanical keyboard having light emitting diodes (LEDs).

Description of Related Art

A conventional mechanical keyboard typically includes keys printed with corresponding text labels. However, since the conventional keyboard does not include a light source, a user finds it difficult to see the text labels clearly in poor light conditions, making finding a desired key difficult.

Some existing keyboards include light sources installed on an upper surface of a circuit board of the keyboard. The keys of the keyboard are positioned on top of the light sources to illuminate the text labels on the keys using the light sources. However, in this configuration, the surface area occupied by the light sources on the circuit board increases and bigger light sources having higher brightness cannot be used.

SUMMARY

Various aspects of the present disclosure provide a keyboard that permits a user to use the keyboard with relative ease in poor light conditions.

According to one aspect of the present disclosure, the keyboard includes a circuit board having an upper surface, a lower surface opposite to the upper surface, and a plurality of cut-out portions, a plurality of key modules positioned on the upper surface and over the plurality of cut-out portions, and a plurality of light sources installed on the lower surface of the circuit board, wherein at least a portion of at least one light source is positioned in a corresponding cut-out portion.

According to another aspect of the present disclosure, the keyboard includes a circuit board having an upper surface, a lower surface opposite the upper surface, a plurality of cut-out portions. A first circuit layer is disposed on the upper surface and a second circuit layer is disposed on the lower surface. The keyboard also includes a plurality of key modules installed in the upper surface, each key module positioned over a corresponding cut-out portion and covering the cut-out portion entirely, and a plurality of light sources, each light source installed on the lower surface and in a corresponding cut-out portion. Each light source includes a light emitting portion and a connector connecting the light source to the second circuit layer, and at least some of the light emitting portion is disposed in the cut-out portion and is positioned beneath and bounded by the key module.

BRIEF DESCRIPTION OF THE DRAWINGS

The following figures are included to illustrate certain aspects of the embodiments, and should not be viewed as exclusive embodiments. The subject matter disclosed is capable of considerable modifications, alterations, combinations, and equivalents in form and function, as will occur to those skilled in the art and having the benefit of this disclosure.

DETAILED DESCRIPTION

Embodiments described herein are directed to a keyboard having internal light sources that illuminate the keys and thereby clearly display the text or labels on the keys to allow a user to use the keyboard with relative ease in poor light conditions.

In mechanical keyboards, when a key is pressed, a connection is made between the key and a circuit on a circuit board of the keyboard, and a signal corresponding to the key is generated. The signal is received by a controller and processed to perform a designated action related to the key. For example, the action may include displaying a letter or numeral represented by the key.

Figure 1A:
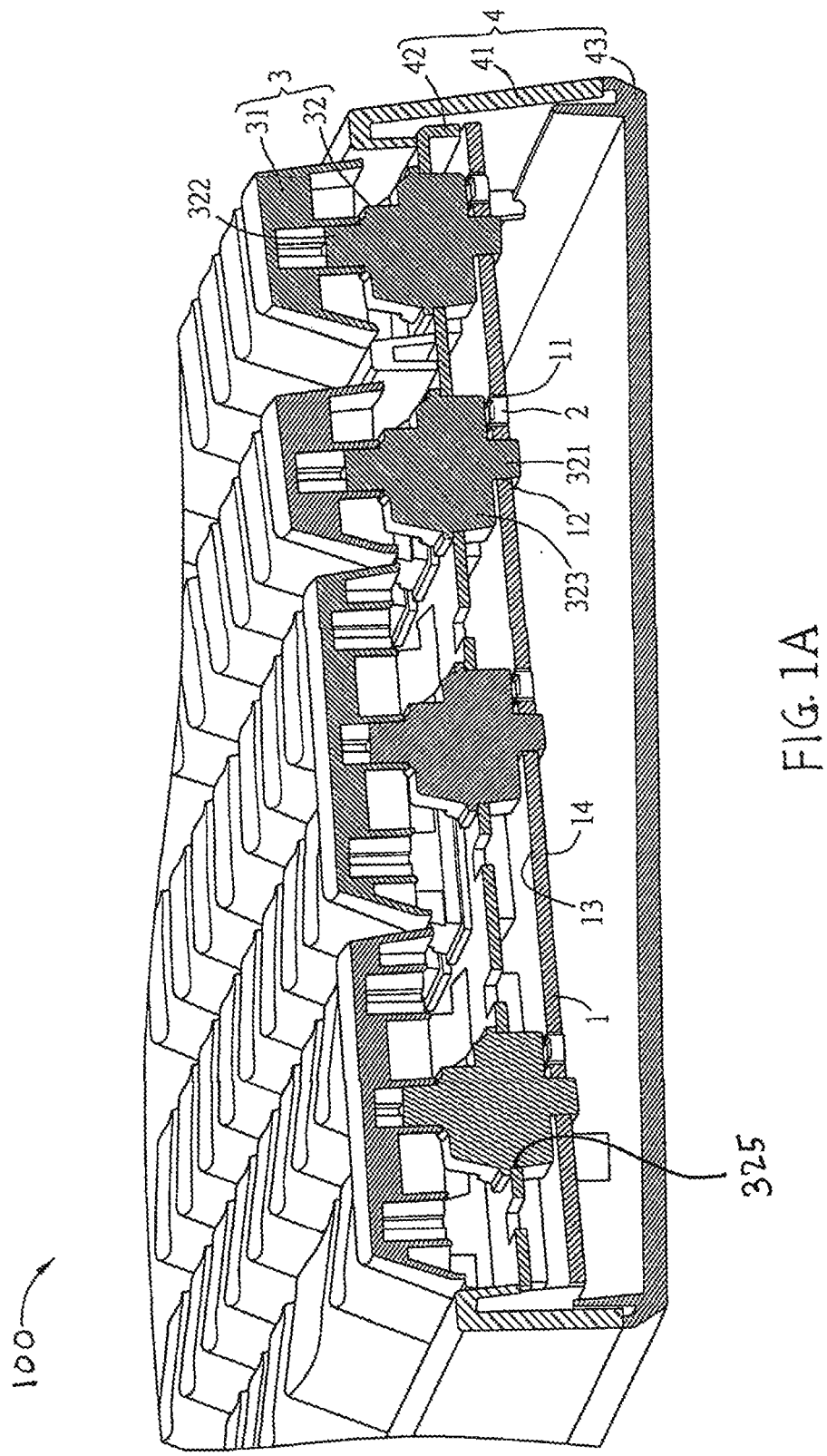
FIG. 1A is a cross-sectional view of a keyboard, according to disclosed embodiments.
Figure 1B:
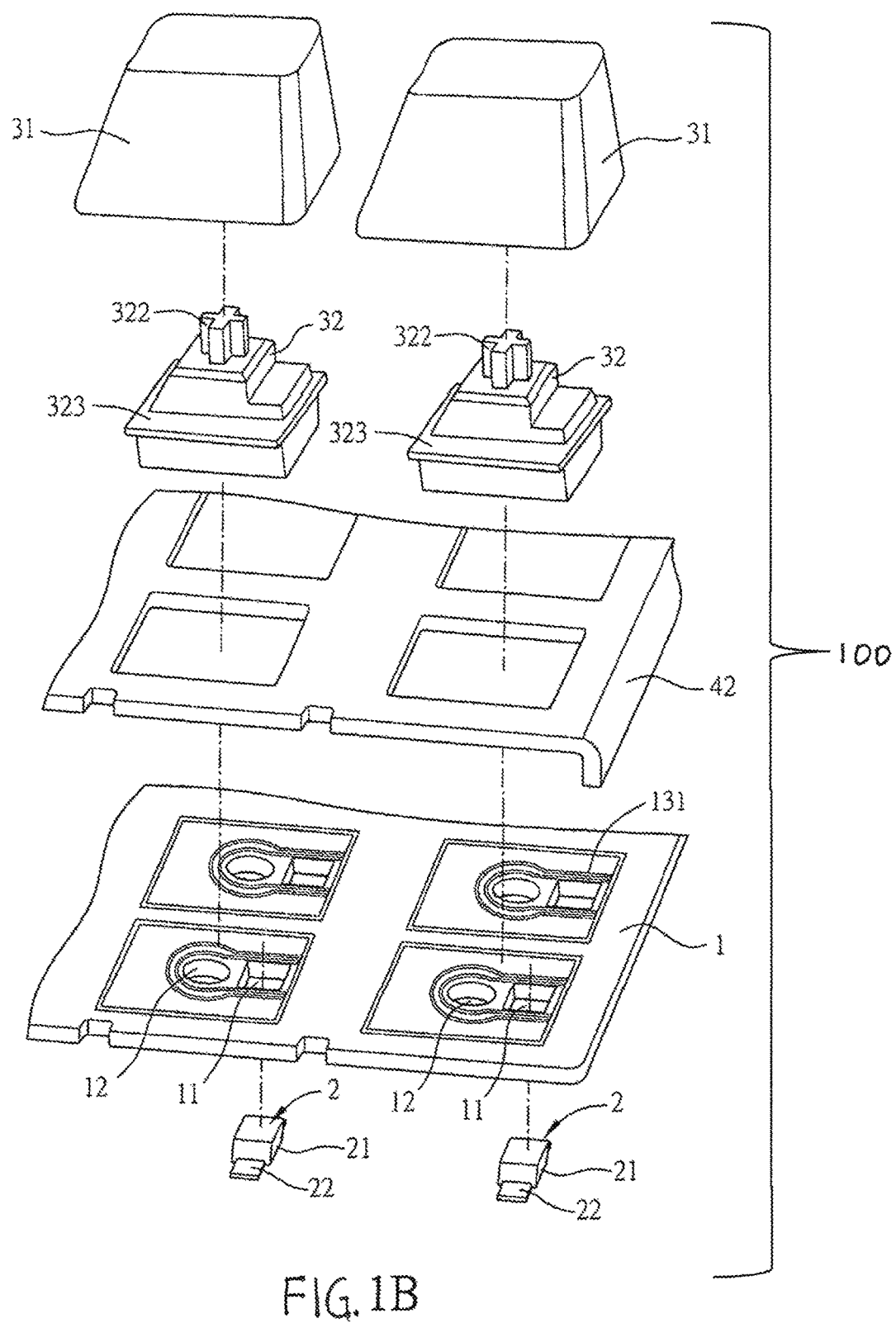
FIG. 1B is an exploded view of a portion of the keyboard of FIG. 1A.

Referring to FIGS. 1A and 1B, a keyboard 100 includes a circuit board 1 (e.g., a printed circuit board (PCB)), a plurality of key modules 3, a plurality of light sources 2, and a housing 4. The circuit board 1 has an upper surface 13 and a lower surface 14 opposite to the upper surface 13. Herein, the upper surface 13 and the lower surface 14 are with reference to illustrative embodiment as depicted in FIGS. 1A and 1B, the upper surface 13 being toward the top of FIGS. 1A and 1B and the lower surface 14 being toward the bottom of FIGS. 1A and 1B. The circuit board 1 may also contain or otherwise define a plurality of cut-out portions 11. In an example, and as illustrated, each cut-out portion 11 may be a through hole penetrating the circuit board 1. As discussed further below, a light source 2 may be installed in each cut-out portion 11.

The housing 4 includes an outer or peripheral casing 41, a positioning rack 42, and a base plate 43. As illustrated, the outer casing 41 and the base plate 43 may receive the circuit board 1. The positioning rack 42 is positioned on the circuit board 1, or more specifically, on the upper surface 13 of the circuit board 1.

As illustrated, the plurality of key modules 3 may be positioned on the upper surface 13 of the circuit board 1 and over the cut-out portions 11. In an example, each key module 3 may entirely cover a cut-out portion 11. Each key module 3 includes a key cap 31 disposed on a key seat 32. The key seat 32 includes a base 323 having a locking portion 321 at a bottom end thereof and an actuator 322 at a top end thereof and received in the base 323. The key cap 31 is installed on the actuator 322, and the actuator 322 and the base 323 are configured such that the actuator 322 may move down in the base 323 when the key cap 31 is pressed and may move up in the base 323 when the key cap 31 is released. Specifically, when the key cap 31 is pressed down, the actuator 322 moves down and at least partially into the base 323 and a circuit (described below) on the circuit board 1 is actuated.

As illustrated, each key module 3 is positioned in a corresponding opening 325 in the positioning rack 42. Further, the circuit board 1 includes a plurality of locking slots 12, each of which is a through hole in the circuit board 1 generally below the opening 325. When the key module 3 is installed, the key seat 32 is received in the opening 325 and the locking portion 321 of the key module 3 is received in the locking slot 12, and the key module 3 is thereby secured in place.

As mentioned above, a light source 2 may be installed in each cut-out portion 11. In an example, the light source 2 may be a light emitting diode (LED). However, other kinds of light sources 2 may also be used, without departing from the scope of the disclosure. Each cut-out portion 11 may be sized or otherwise configured to receive a single light source 2. The shape and size of the cut-out portion 11 may correspond to the shape and size of the light source 2 that is installed therein. The light source 2 and thus the cut-out portion 11 are not limited to any particular shape and size, and light sources 2 having different shapes and sizes may be installed in the circuit board 1, without departing from the scope of the disclosure.

Each light source 2 may include a light emitting portion 21 and connectors 22. In an example, each cut-out portion 11 may be sized or otherwise configured to receive at least a portion of the light emitting portion 21. In prior art keyboards, the light sources 2 are not installed in the corresponding cut-out portions 11, but are installed below the corresponding cut-out portions 11. By including the light emitting portion 21 in the cut-out portion 11, scattering of the light emitted by the light sources 2 is substantially reduced, and the light is more focused and projected more evenly on the key modules 3. Also, the distance between the key cap 31 and the light source 2 is reduced, and thereby the key cap 31 is illuminated more brightly. Further, as described below, the circuits for the keyboard and the light sources can be implemented on a single circuit board since the light emitting portion does not occupy space on the circuit board surface. Finally, since the light emitting portion 21 in located cut-out portion 11, the light emitting portion 21 may not interfere with the placement of the key modules 3 on the keyboard 1.

Each key module 3 is installed such that the entire light emitting portion 21 is covered by the key module 3. More specifically, the light emitting portion 21 and the cut-out portion 11 in which the light emitting portion 21 is installed may be covered by the key seat 32 in their entirety. In other words, the light emitting portions 21 are positioned beneath and bounded by the corresponding key modules 3. The key seats 32 may include a light transmitting material that permits light emitted by the light sources 2 to pass through the key seats 32 and illuminate the corresponding key caps 31. As a result, the text or label on the key caps 31 is also illuminated and clearly displayed to allow a user to use the keyboard 100 with relative ease even in poor light conditions. Because the light emitting portion 21 is entirely underneath a key module 3, light from adjacent light emitting portions does not interfere with the light emitted by the light emitting portion 21. Thus, adjacent key modules 3 can use light sources 2 generating light having different intensities and/or colors.

Figure 2A:
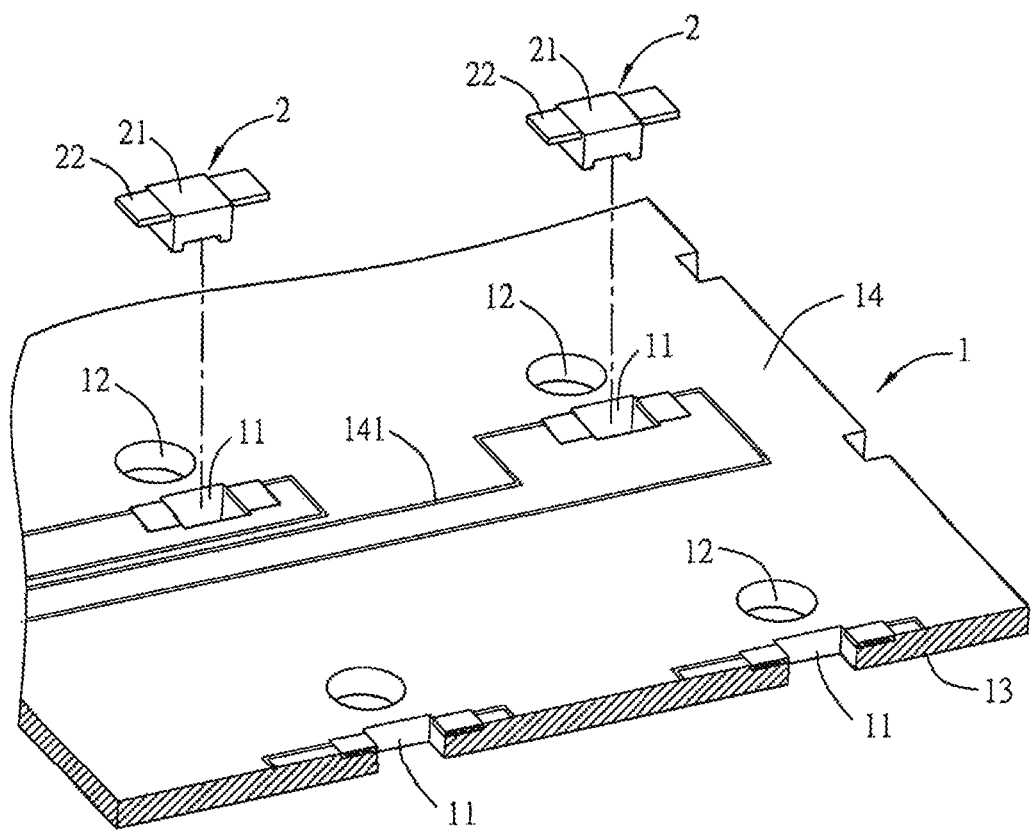
FIG. 2A is a schematic view of the lower surface of the circuit board of FIGS. 1A and 1B with the light sources removed therefrom, according to disclosed embodiments.
Figure 2B:
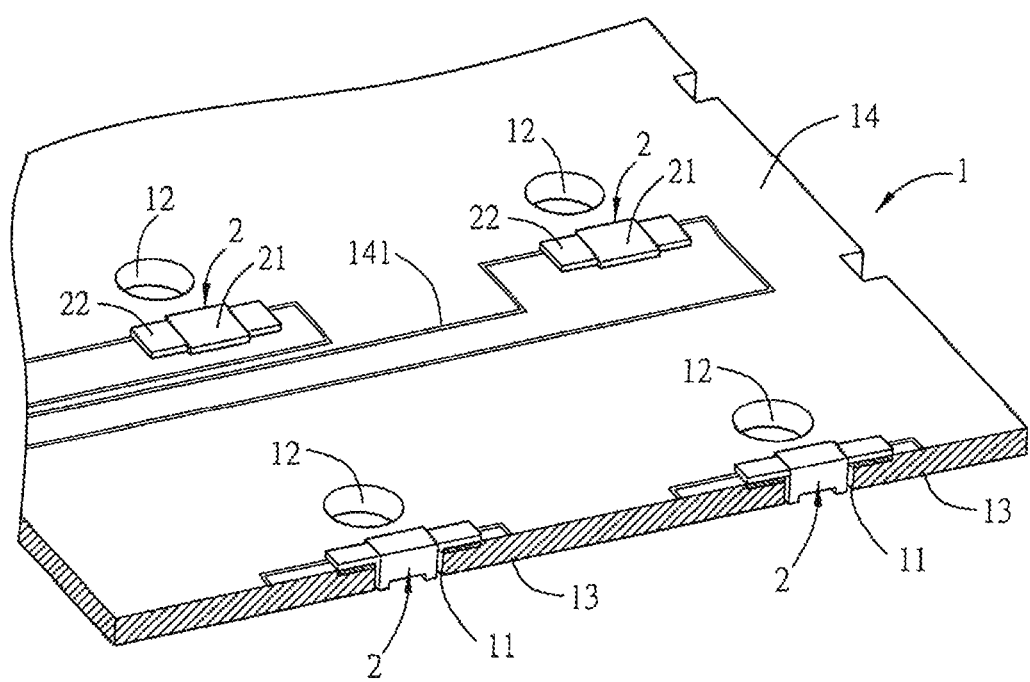
FIG. 2B is a schematic view of the lower surface of the circuit board of FIGS. 1A and 1B with the light sources installed therein, according to disclosed embodiments.

Referring to FIGS. 2A and 2B, with continued reference to FIG. 1B, the upper surface 13 includes a first circuit layer 131, and the lower surface 14 includes a second circuit layer 141. For instance, the circuit board 1 may be a printed circuit board (PCB) and the first circuit layer 131 and the second circuit layer 141 may be etched in the PCB. The first circuit layer 131 may be or include a triggering circuit that may generate a signal when a key cap 31 of a key module 3 is pressed. More specifically, when the key cap 31 is pressed, the actuator 322 is pressed down and a signal corresponding to the pressed key cap 31 is transmitted to a control circuit via the triggering circuit. The control circuit processes the signal to generate a corresponding key code.

When the light source 2 is installed in the circuit board 1, the connectors 22 may be connected to the second circuit layer 141. In an example, and as illustrated in FIG. 2A, the light sources 2 are installed (e.g., using Surface Mounted Technology (SMT)) on the lower surface 14 of the circuit board 1. Stated otherwise, the light sources 2 are installed on the circuit board 1 in a direction from the lower surface 14 to the upper surface 13. When installed, the light emitting portion 21 of the light source 2 may be received in the cut-out portion 11 and the light emitting portion 21 may be substantially flush with the upper surface 13 of the circuit board 1, the light emitting portion 21 may protrude a small distance from the upper surface 13, or the light emitting portion 21 may be a small distance inside the cut-out portion 11 from the upper surface 13.

The second circuit layer 141 may be or include a power circuit for operating the light source 2. When the light source 2 is installed, the light emitting portion 21 is connected to the power circuit via the connectors 22 and the power circuit may illuminate the light emitting portion 21. As understood from the discussion above, the power circuit and the triggering circuit are disposed on opposite sides of the circuit board 1. As a result, interference or crosstalk between the power circuit and the triggering circuit can be minimized. Because the light sources 2 are connected to the lower surface 14 of the circuit board 1, another advantage of the keyboard 100 is that more surface area is available on the upper surface 13 for implementing other circuits or for other purposes. Additionally, large size light sources 2 that are relatively brighter and/or different varieties of light sources 2 can be installed on the lower surface 14 due to an increased available lower surface area.

Therefore, embodiments disclosed herein are well adapted to attain the ends and advantages mentioned as well as those that are inherent therein. The particular embodiments disclosed above are illustrative only, as the embodiments disclosed may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The embodiments illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

What is claimed is:

1. A keyboard, comprising:
   a circuit board having an upper surface, a lower surface opposite to the upper surface, a plurality of locking slots, and a plurality of cut-out portions, wherein each locking slot of the plurality of locking slots is located laterally adjacent a corresponding cut-out portion of the plurality of cut-out portions and the plurality of locking slots and the plurality of cut-out portions are coplanar;
   a plurality of key modules positioned on the upper surface and over the plurality of cut-out portions, wherein at least a portion of each key module is received in a corresponding locking slot of the circuit board; and
   a plurality of light sources installed on the lower surface of the circuit board, wherein at least a portion of at least one light source is positioned in a corresponding cut-out portion.

2. The keyboard of claim 1, wherein each light source includes a light emitting portion and a connector for connecting the light source to the circuit board.

3. The keyboard of claim 2, wherein the light emitting portion of the at least one light source is substantially flush with the upper surface of the circuit board.

4. The keyboard of claim 2, wherein the light emitting portion of the at least one light source protrudes from the upper surface of the circuit board.

5. The keyboard of claim 2, wherein the light emitting portion of the at least one light source is displaced from the upper surface inside the cut-out portion.

6. The keyboard of claim 2, wherein each light source is positioned beneath and bounded by a corresponding key module, and the connector is coupled to the lower surface of the circuit board.

7. The keyboard of claim 2, wherein the upper surface of the circuit board includes a first circuit layer and the lower surface of the circuit board includes a second circuit layer, and the connector is coupled to the second circuit layer.

8. The keyboard of claim 1, wherein each key module is positioned above and at least bounds the corresponding cut-out portion.

9. The keyboard of claim 1, wherein
   each key module includes a key cap disposed on a key seat, and
   the key seat includes a base having a locking portion at a bottom end thereof and received in the corresponding locking slot, and an actuator at a top end thereof and received in the base.

10. The keyboard of claim 1, wherein the keyboard is a mechanical keyboard.

11. The keyboard of claim 1, wherein the plurality of light sources include light emitting diodes (LEDs).

12. The keyboard of claim 9, wherein the plurality of light sources are presented in a direction from the lower surface of the circuit board to the upper surface of the circuit board.

13. A keyboard, comprising:
    a circuit board having an upper surface, a lower surface opposite the upper surface, a plurality of locking slots, a plurality of cut-out portions, wherein a first circuit layer is disposed on the upper surface and a second circuit layer is disposed on the lower surface, wherein each locking slot of the plurality of locking slots is located laterally adjacent a corresponding cut-out portion of the plurality of cut-out portions and the plurality of locking slots and the plurality of cut-out portions are coplanar;
    a plurality of key modules installed in the upper surface, each key module positioned over a corresponding cut-out portion and covering the cut-out portion entirely, and at least a portion of each key module received in a corresponding locking slot of the circuit board; and
    a plurality of light sources, each light source installed on the lower surface and in a corresponding cut-out portion, wherein
        each light source includes a light emitting portion and a connector connecting the light source to the second circuit layer, and
        at least some of the light emitting portion is disposed in the cut-out portion and is positioned beneath and bounded by the key module.

14. The keyboard of claim 13, further comprising:
    each key module includes a key cap disposed on a key seat, and
    the key seat includes a base having a locking portion at a bottom end thereof and received in a corresponding locking slot, and an actuator at a top end thereof and received in the base.

15. The keyboard of claim 14, wherein the key seat includes a light transmitting material.

16. The keyboard of claim 14, further comprising a positioning rack disposed over the circuit board and containing a plurality of openings, each opening having the key seat disposed therein.

17. The keyboard of claim 13, wherein the light emitting portion is substantially flush with the upper surface of the circuit board.

18. The keyboard of claim 13, wherein the light emitting portion protrudes from the upper surface of the circuit board.

19. The keyboard of claim 13, wherein the light emitting portion is displaced from the upper surface inside the cut-out portion.

* * * * *